United States Patent [19]

Okano et al.

[11] Patent Number: 4,525,712

[45] Date of Patent: Jun. 25, 1985

[54] TRANSACTION PROCESSING SYSTEM

[75] Inventors: Yoshio Okano; Yasuo Okuma; Kuniomi Aizawa, all of Seto; Yasuyoshi Oyama, Owariasahi; Yoichiro Kitamura, Kashiwa, all of Japan

[73] Assignee: Hitachi, Ltd., Tokyo, Japan

[21] Appl. No.: 349,856

[22] Filed: Feb. 18, 1982

[30] Foreign Application Priority Data

Apr. 24, 1981 [JP] Japan ................................ 56-61216

[51] Int. Cl.$^3$ ............................................ H04Q 9/00

[52] U.S. Cl. ............................ 340/825.31; 179/2 DP

[58] Field of Search ..................... 340/825.31, 825.34; 235/380; 179/2 DP, 2 CA

[56] References Cited

U.S. PATENT DOCUMENTS 4,025,760 5/1977 Trenkamp ..................... 340/825.34

4,114,139 9/1978 Boyd et al. ......................... 340/825

4,264,782 4/1981 Konheim ....................... 340/825.34

4,315,101 2/1982 Atalla ............................ 340/825.34

4,317,957 3/1982 Sendrow ....................... 340/825.34

*Primary Examiner*—Donald J. Yusko

*Attorney, Agent, or Firm*—Antonelli, Terry & Wands

[57] ABSTRACT

In a system for the transaction operation with terminal units connected to a central unit through the communication line, the transaction operation by use of an ineligible terminal unit is prevented. An illegality preventive information is provided for each terminal unit and stored in each terminal unit and the central unit. When the terminal unit transmits transaction data to the central unit, it also transmits the illegality preventive information registered in it. The central unit carries out the transaction process when the received illegality preventive information coincides with or has a certain relationship to the registered information.

9 Claims, 7 Drawing Figures

MAGNETIC CARD DATA FORMAT

REGISTRATION REQUEST DATA FORMAT (TERMINAL TO CENTRAL UNIT)

REGISTRATION COMPLETION DATA FORMAT (CENTRAL UNIT TO TERMINAL)

TRANSACTION DATA FORMAT (TERMINAL TO CENTRAL UNIT)

TRANSACTION REPLY DATA FORMAT (CENTRAL UNIT TO TERMINAL)

TRANSACTION PROCESSING SYSTEM

BACKGROUND OF THE INVENTION

The present invention relates to a transaction processing system in which a central unit is connected to terminal units through communication lines or signal lines so that communication of data is established for carrying out the transaction process.

It has been practiced for the automatic cash dispenser (CD) and the like in the bank service system that when a customer opens an account with a bank, the bank issues a magnetic card with a secret code specified by the customer and an account number recorded thereon in order to provide an identification of the legitimate user who is making a transaction using the cash dispenser. When the customer deals with the cash dispenser, he (she) is requested to enter the magnetic card and also key the secret code into the cash dispenser, and entry of transaction data is allowed only if the secret code recorded on the magnetic card coincides with the secret code keyed-in by the user. There have been practiced various means of preventing an illegal transaction by checking the legitimacy of user through use of the secret code, such as seen in the illegal transaction preventing system for checking that the user of the cash dispenser is a legitimate user who knows the secret code recorded on the magnetic card.

As described above, the conventional method of preventing an illegal transaction which has been commonly practiced is that of using an installation type equipment, such as a cash dispenser, in which it is checked whether the transacting operator is an eligible person who knows the specific key word, thereby preventing an illegal transaction.

However, in the case of a transportable terminal unit, which is carried by the canvasser of the bank to the customer for making a transaction and which is connected to the central unit for data transmission using a customer's telephone set, the unit could be stolen for purposes of effecting an illegal transaction or an illegal transaction could be carried out using a device which cannot be used in its own system (e.g., the central unit of bank A which carries out the transaction by connecting only the transportable terminal device owned by bank A is connected with a transportable terminal unit owned by bank B, or a device having the same function as that of the transportable terminal unit owned by bank A is illegally manufactured using a microcomputer and connected to the central unit of bank A). Therefore, the transaction system using transportable terminal units which are connected to the central unit through public communication lines cannot be prevented from illegal actions only by checking the legitimacy of the unit operator using a secret code and the like as has been described in the case of an illegal transaction preventing system for a cash dispenser.

SUMMARY OF THE INVENTION

The present invention has an object to the foregoing prior art deficiencies, and it is an object of the invention to provide a transaction processing system in which terminal units allowable to carry out a transaction are designated specifically so that illegal transactions using ineligible terminal units are prevented.

The present invention is characterized as follows. Illegality preventive information is registered in advance in terminal units used for a transaction. When transaction data is transferred from a terminal unit to the central unit, the illegality preventive information registered in the terminal unit is transferred together with the transaction data. The central unit receives and holds the illegality preventive information specifically for each terminal unit, and checks whether the received information coincides with or has a certain relationship to illegality preventive information corresponding to that terminal unit. The central unit carries out the transaction process only when the consistency or certain relationship of both information is fulfilled. Thus, eligible terminal units can be identified and the use of ineligible terminal units for a transaction can be prevented.

DESCRIPTION OF THE PREFERRED EMBODIMENT

Figure 1:
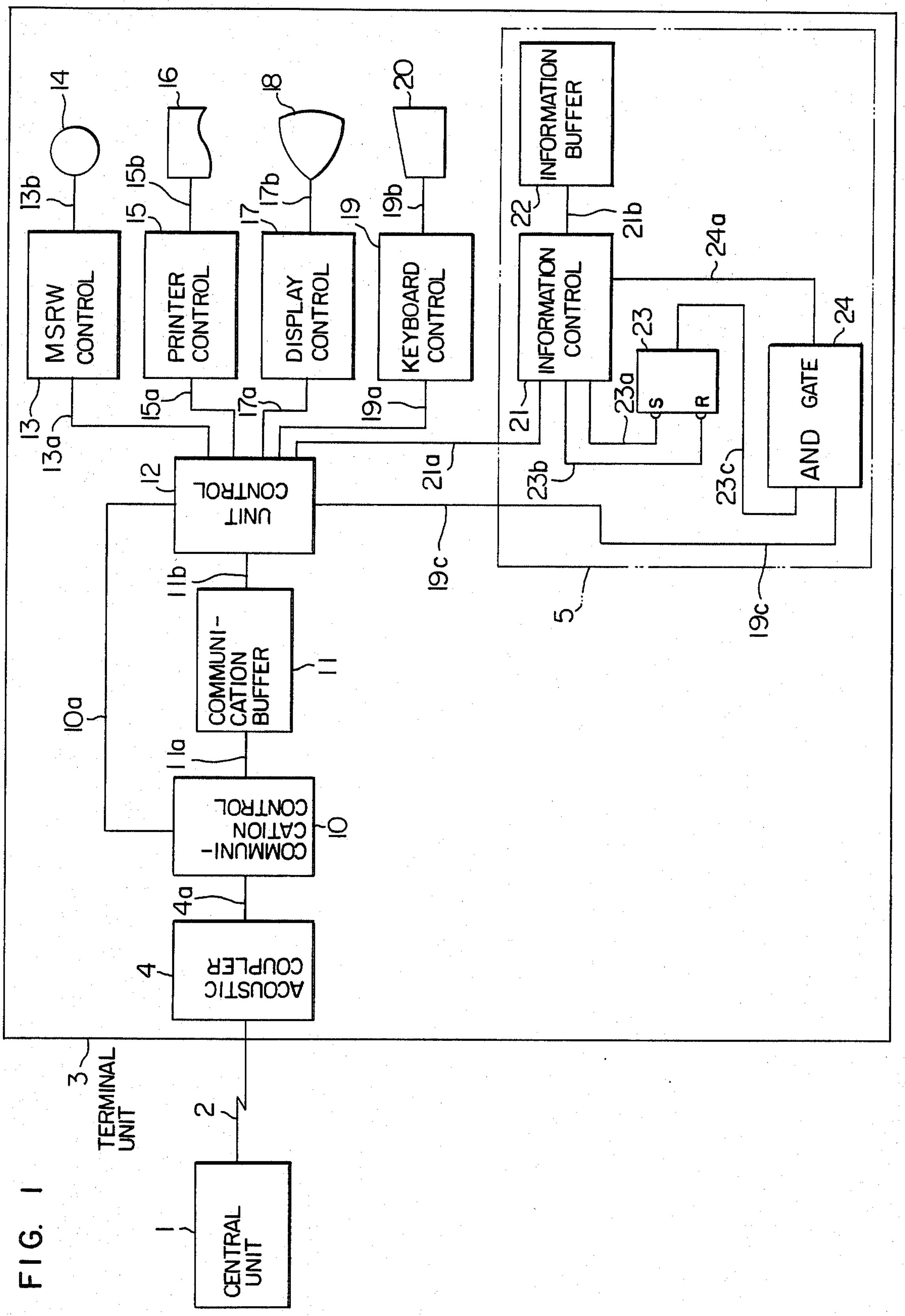
FIG. 1 a block diagram showing the connection between the central unit and the terminal unit, and the arrangement of the terminal unit.

An embodiment of the present invention will now be described in detail with reference to the drawings. FIG. 1 shows the connection between the central unit and a transportable terminal unit (hereafter termed simply as a terminal unit), and the arrangement of the terminal unit embodying the present invention.

In FIG. 1, a central unit 1 is connected to a terminal unit 3 through a public communication line 2. The public line 2 is a telephone line and the line connection in the form shown in FIG. 1 is established when the terminal unit 3 is carried to the customer where the central unit 1 is called by dialing a customer's telephone set and the telephone handset (not shown) is placed on an acoustic coupler 4 of the terminal unit 3. Thus, data transmission between the central unit 1 and the terminal unit 3 is made available.

The terminal unit 3 is a business data input/output device of the type having a function of transmitting input data from its own input devices to the central unit 1 and a function of delivering data received from the central unit 1 to its own output devices. The terminal unit 3 will be described in detail later.

Figure 2:
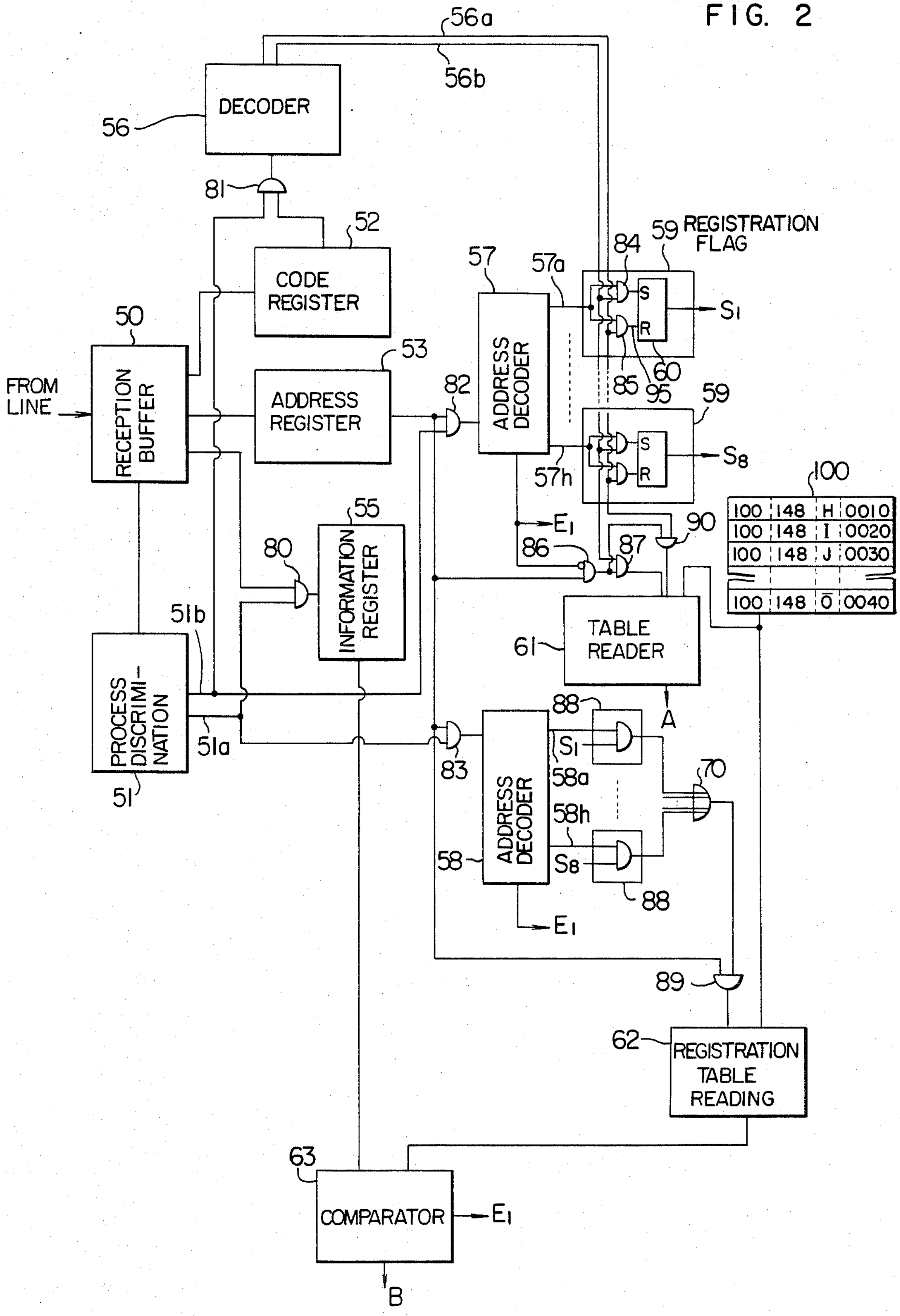
FIG. 2 is a block diagram showing portions of the central unit related to the present invention.

The central unit 1 receives data from the terminal unit 3, transmits illegality preventive information to be registered to the terminal unit 3 in accordance with the received data, checks illegality preventive information in the received data, carries out the transaction process for transaction data in the received data when no error has resulted in the checking, and then transmits transaction reply data to the terminal unit which has sent the transaction data. FIG. 2 is a block diagram useful to explain the operation of the central unit 1, in which the table 100 stores illegality preventive information to be registered to the eligible terminal units allowed by the central unit 1 in correspondence to the address of the units. The operation of the central unit 1 will be described in detail later.

The following describes the overview of the operation of the system consisting of the central unit and terminal units.

In this system, illegality preventive information is registered to the terminal unit before it is transported from the office to the customer where a transaction will be carried out. The procedures for registering the illegality preventive information and its processing are as follows. Initially, the registration processing magnetic card carried by an executive manager and the like is read by the magnetic stripe reader/writer (MSRW) provided on the terminal unit. A telephone set in the office is dialled to call the central unit, and the handset is placed on the acoustic coupler of the terminal unit. After line connection has been established, the transmission key on the keyboard of the terminal unit is depressed.

Figure 3:
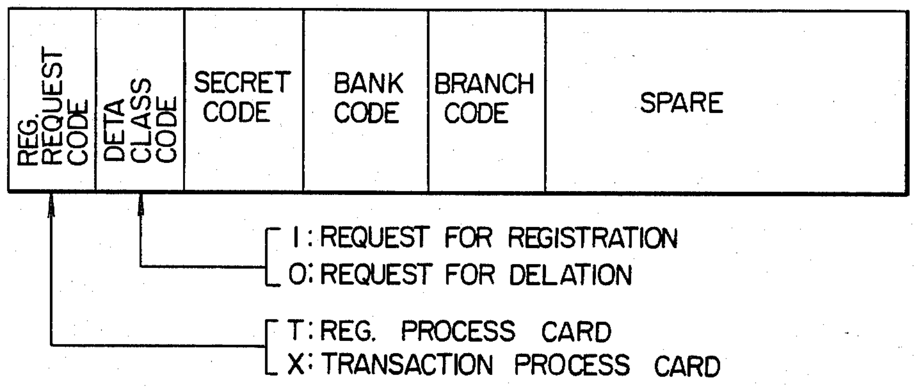
FIG. 3 is an illustration showing the data format of the magnetic card used on the terminal unit for requesting the host system the transmission of illegality preventive information.
Figure 4:
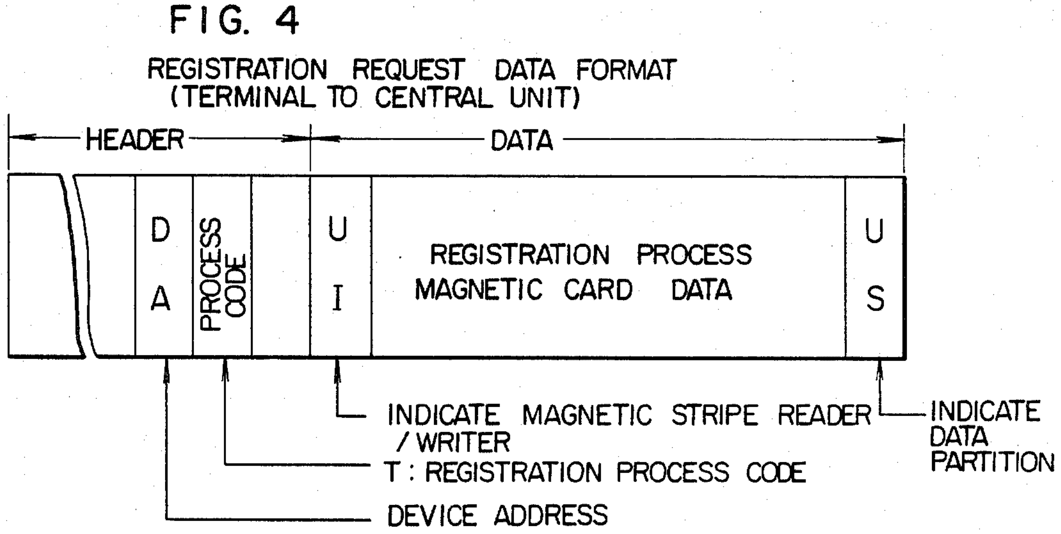
FIGS. 4, 5, 6 and 7 are illustrations each showing the data form in a communication between the central unit and one or more terminal units.

Following these operations, the terminal unit edits data read through the MSRW in the form shown in FIG. 3 into the transmission data format shown in FIG. 4, then transmits the data to the central unit. Data as shown in FIG. 4 will be termed registration request data. The header section of the registration request data contains a device address which is assigned specifically to each terminal unit and a process code T (registration process code) signifying the registration processing request.

When the central unit receives a registration request data message from the terminal unit, it determines from the process code in the data that the request is registration process request. The device address is decoded to set up the registration flag corresponding to the terminal unit. Then, information (illegality preventive information) corresponding to the device address stored in the illegality preventive information registration table is read out. The read out information is edited in the form shown in FIG. 5, and the registered data is transmitted to the terminal unit which has issued the registration request data.

When the terminal unit receives the registered data, it identifies the illegality preventive information from the unit identification (UI) code in the received data. Then, this information is stored in the illegality preventive information buffer and the illegality preventive information registration flag is set.

Thus, the registration process is completed and the terminal unit is ready to be used as an input/output device for transaction data. The terminal unit is now ready for transportation to the customer so that the transaction process is carried out through the transacting operation.

Figure 6:
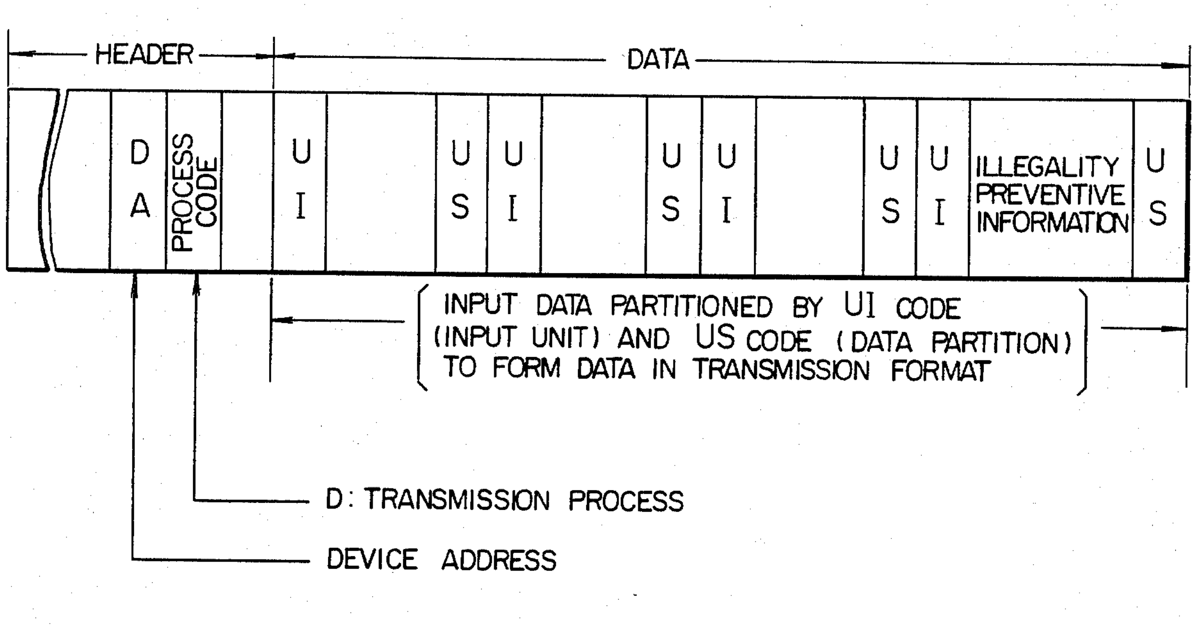

The following describes the overview of the transacting operation and the processing procedures. The terminal unit is carried to the customer and the like and certain transaction data is entered through the input devices of the terminal unit. After establishment of a line connection to the central unit as mentioned previously, the transmission key on the keyboard of the terminal unit is depressed. Then, the terminal unit edits the input data from each input device by adding the UI code and the unit separator (US) code, and checks the illegality preventive information registration flag. If this flag is set, the contents of the illegality preventive information buffer are partitioned by the UI code and US code as in the case of the input data. Then, the resultant information is edited into the transaction data transmission format as shown in FIG. 6 and it is transmitted as transaction data to the central unit. The header section of the transmitted data contains the device address, process code (transaction process code) signifying the transaction process request and so on.

Figure 7:
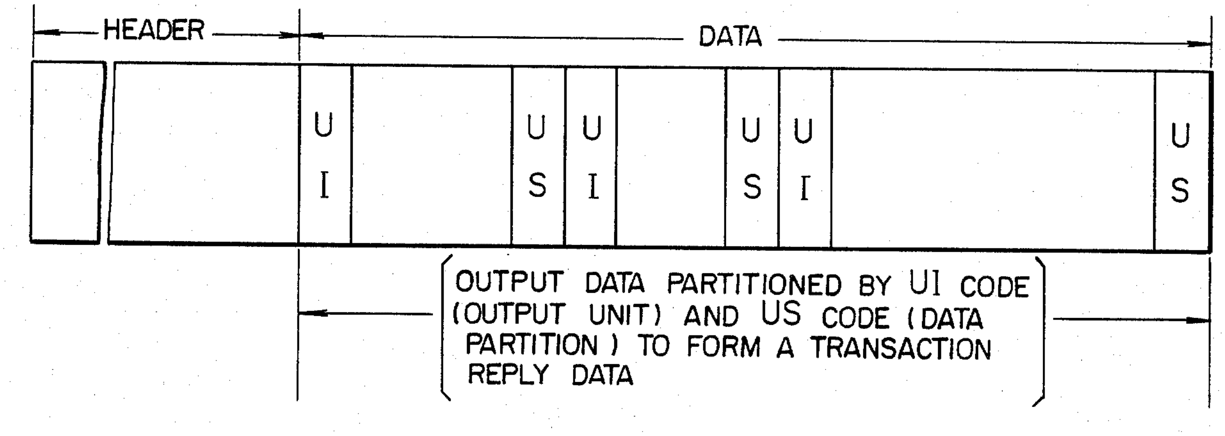

On receiving the transaction data from the terminal unit, the central unit determines from the process code in the header section of the received data that the transaction processing is requested. Then, the device address of the terminal unit which has sent the transaction data is decoded and the requesting terminal unit is checked by the registration flag to determine whether it is a terminal unit which has been processed for registration. Only when the terminal unit is found to be registered, illegality preventive information in the received data is compared with the illegality preventive information in the illegality preventive information registration table in the central unit, and the transaction process for the received data is carried out only when both information coincide. Transaction reply data is created and edited into the format as shown in FIG. 7, then it is transmitted to the terminal unit which has sent the transaction data. On receiving the transaction reply data from the central unit, the terminal unit designates an output device based on the UI code in the received data, and outputs the received data to the output device to complete the transaction process.

The operations of the terminal unit and the central unit will now be described.

First, the operation of the terminal unit will be described in detail with reference to FIG. 1.

The magnetic stripe reader/writer (MSRW) 14 uses a magnetic storage medium such as a magnetic card with a magnetic stripe thereon, and has a guide groove for scanning a magnetic card or the like manually relative to the magnetically recorded information read/write head. The MSRW control circuit 13 controls reading and writing of magnetically recorded information. When a magnetic card or the like is scanned along the scanning guide groove, magnetically recorded information is read out and stored in a buffer, then transferred to the unit control circuit 12. When a magnetic card or the like is scanned along the scanning guide groove while writing information is being held in the buffer in response to a write command from the unit control circuit 12, the writing information held in the buffer is written onto the magnetic card or the like.

The printer 16 is a printing device which prints on a printing media, including a print head, a print head drive mechanism, a print medium setting mechanism and so on. When the unit control circuit 12 issues an output command and print data to the printer control circuit 15, the printer 16 operates to drive the print head and others for printing on print media under control of the printer control circuit 15.

The keyboard 20 includes data entry keys, a transmission command key and other keys necessary for entering transaction data. When a key on the keyboard is pressed, the keyboard control circuit 19 generates a code corresponding to that key and sends the code to the unit control circuit 12.

The display unit 18 provides the guidance of operation and monitoring for input data. When the unit control circuit 12 provides an output command, a display address and display data to the display control circuit 17, the display unit 16 displays the received data under control of the display control circuit 17.

The illegality preventive information control section 5 is made up of an illegality preventive information control circuit 21, an illegality preventive information buffer 22, an AND gate 24 and an illegality preventive information registration flag flip-flop 23. The illegality preventive information buffer 22 is a rewritable buffer and it stores illegality preventive information sent from the illegality preventive information control circuit 21. The illegality preventive information control circuit 21 controls registration, deletion and reading of illegality preventive information. When the control circuit 21 is given the registration command, it receives illegality preventive information from the unit control circuit 12 and sets the received information into the illegality preventive information buffer 22. At the same time the control circuit 21 provides an ON signal on the signal line 23*a* so that the flip-flop 23 outputs an ON signal on its output signal line 23*c* (i.e. the state of registration). When the control circuit 21 is given the command of deleting a registered illegality preventive information (i.e., when illegality preventive information has only 0's bits), it provides an ON signal on the signal line 23*b* so that the flip-flop 23 outputs an OFF signal on the signal line 23*c*. (i.e. the state of no registration).

The AND gate 24 has one input connected to the output signal line 23*c* from the flip-flop 23 and another input connected to the signal line 19*c* on which a signal appears when the unit control circuit 12 receives the transmission key code from the keyboard control circuit 19. When the AND gate 24 has active signals on both input signal lines, it sends out an illegality preventive information read command signal to the illegality information control circuit 21 through the signal line 24*a*. When the illegality preventive information control circuit 21 detects a signal on the signal line 24*a*, it reads out the contents of the illegality preventive information buffer 22 and sends it to the unit control circuit 12.

The communication control circuit 10 carries out control for sending data stored in the communication buffer 11 to the acoustic coupler 4 in response to the communication command signal issued by the unit control circuit 12 over the signal line 10*a* and also setting data sent from the acoustic coupler 4 in the communication buffer 11 and reporting the reception of data to the unit control circuit 12 over the signal line 10*a*.

The acoustic coupler 4 has a telephone handset holder, and it converts the signal coming from the telephone line through the telephone set into the internal signal used in the terminal unit 3. The coupler 4 also carries out control for transmission of signal to the communication control circuit 10, receiving the signal sent from the communication control circuit 10 and transmitting the signal converted into the line transmission signal to the communication line 2.

The unit control section is a circuit for controlling all of the input/output devices. When the circuit receives data from each input device, holds the data, edits the data into the display format, and sends the edited data to the display control circuit 17 so that the data is monitored on the display unit 18. In addition, when the transmission key on the keyboard 20 is pressed and the unit control circuit receives the transmission key code from the keyboard control circuit 19 through the signal line 19*a*, the circuit appends a UI code indicating the input device and a US code indicating the partition of data to each entry item of stored data so as to edit the input data into the transmission format. At the same time, the circuit sends out a signal over the signal line 19*c* so that the contents of the illegality preventive information buffer 22 in the illegality preventive information control section 5 are read out, and appends the contents to the edited data. Further, the circuit checks input data for the entry of card data for the previously mentioned registration request processing from the MSRW 14. When the entry of the data is found, the circuit sets the registration process code T to the process code section of the header section as shown in FIG. 4, or when there is no entry of data, the circuit sets the transaction process code D to the process code section as shown in FIG. 6. Further, the circuit appends the device address (DA) of its own terminal unit to the data and sets it in the communication buffer 11 so that the transmission command is issued to the communication control circuit 10 over the signal line 10*a*.

Figure 5:
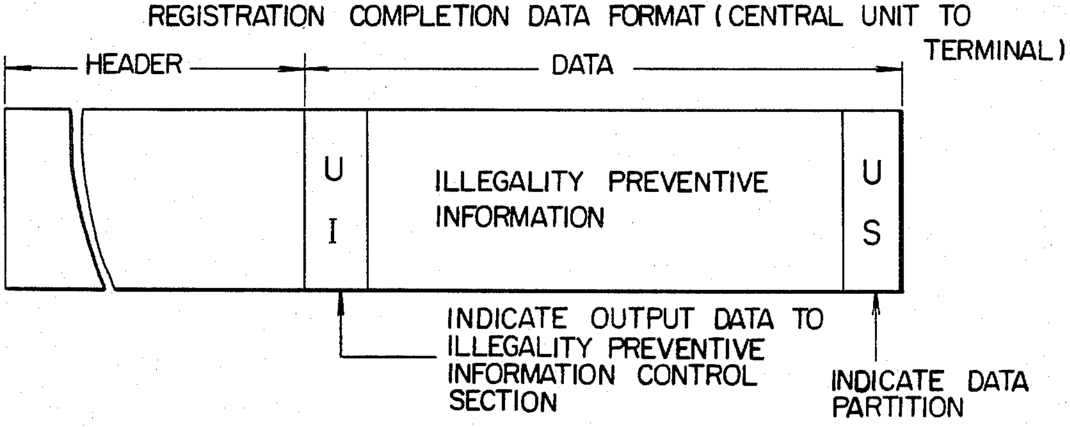

On the other hand, when data is transmitted from the central unit 1, the communication control circuit 10 identifies the beginning of data with reference to the flag character appended at the top of the data (this character indicates the beginning and end of data and is not used as a data code), and checks for the coincidence of each character in the subsequent reception data with the flag character. If no coincidence of characters has found, the data is transferred sequentially to the communication buffer 11. If the received data coincides with the flag character, transfer of the received data is suspended, and the reception of data is reported to the unit control circuit 12 through the signal line 10*a*. As described above, received data stored in the communication buffer 11 is any of the registration completion data as shown in FIG. 5 or the transaction reply data as shown in FIG. 7.

The unit control circuit 12 receives the report of data reception, as described above, from the communication control circuit 10, and sends out data from the UI code upto the US code following the header section stored in the communication buffer 11 to the output device directed by the UI code. The UI code in the communication data specifies the output device for received data, and a specific UI code is given to each of the MSRW 14, printer 16, display unit 18 and illegality preventive information control section 5. The unit control circuit 12 decodes the UI code in the received data, and if the UI code indicates the MSRW 14, data following the UI code is sent out sequentially over the signal line 13*a* until the US code is detected. Similarly, if the UI code indicates the printer 16, the display unit 18 or the illegality preventive information control section 5, data is sent out over the signal line 15*a*, 17*a* or 21*a*, respectively. Thus, setup for data writing, printing, display, registration of illegality preventive information, and the status of registration or non-registration of illegality preventive information is made for the magnetic card or the like, as described above.

FIG. 2 is a block diagram showing portions of the central unit related to the present invention. The operation of the central unit will be described in detail with reference to FIG. 2.

The reception buffer 50 stores data sent from the terminal unit. The process discrimination circuit 51 reads out and decodes the process code in the header section of the received data. When the process code is the registration process code T, a signal is sent over the signal line 51*b*, and when it is the transaction process code D, a signal is sent over the signal line 51*a*. The register 52 extracts and holds the data discrimination code in data when the received data includes magnetic card data for the registration process. The address register 53 extracts and holds the device address recorded in the header section of the received data.

The AND gate 81 opens when it has a signal on the signal line 51*b*and the above-mentioned data discrimination code of the data is set in the register 52 so that the contents of the register 52 are transferred to the decoding circuit 56. The decoder 56 decodes the data discrimination code coming through the AND gate 81, and if it is "1" (indicating the illegality preventive information registration request), a signal is sent over the signal line 56*b;* if it is "0" (indicating the illegality preventive information deletion request), a signal is sent over the signal line 56*a.*

The AND gate 82 opens when the device address is set in the address register 53 and there is a signal on the signal line 51*b,* so that the contents of the address register 53 are transferred to the address decoder 57. The address decoder 57 receives device address data through the AND gate 82, and decodes the data to produce a signal corresponding to the device address on the output line. (In this embodiment, the signal is sent out over the signal line 57*a,* 57*b* . . . or 57*h* when device address "1", "2", . . . or "8" is received, respectively.) If an illegal device address (a device address other than "1" through "8" in this embodiment), an error signal E1 is issued.

Each of the registration flags 59 consist of two AND gates and a flip-flop, and each is provided corresponding to each output signal line from the address decoder 57, i.e., each data transmitting terminal address. Each signal line from the address decoder 57 is connected to the AND gates 84 and 85 of each registration flag register 59. The AND gate 84 has inputs connected to an output signal line from the address decoder 57 and the signal line 56*b,* and outputs a signal to the set input of the flip-flop 60 when there are signals on both input signal lines.

The AND gate 85 has inputs connected to an output signal line from the same address decoder 57 as for the AND gate 84 and the signal line 56*a* and outputs a signal to the reset input of the flip-flop 60 when there are signals on both input signal lines. The flip-flop 60 produces an output signal when a signal is given at the set input and terminates the output signal when it receives a signal at the reset input. Accordingly, when the reception buffer 50 receives registration request data, the output signals S1-S8 of the registration request flag registers 59 corresponding to the device address of the request data transmitting terminal are activated or deactivated in accordance with the data discrimination code in the registration request data. That is to say, if the data discrimination code is "1" (the case for setting illegality preventive information in the terminal unit), the output of the registration flag register 59 becomes active, indicating that illegality preventive information is effective for the corresponding terminal unit; if the data discrimination code is "0" (the case for deleting illegality preventive information for the terminal unit), the output of the registration flag register 59 becomes inactive, indicating that illegality preventive information of the corresponding terminal unit has no effect.

The AND gate 86 receives the output of the address register 53 and the inverted error output signal E1 from the address decoder 57, and opens when the device address is set into the address register 53 and there is no error output signal E1 from the address decoder 57, so that the contents of the address register 53 are sent out. The AND gate 87 receives the output of the AND gate 86 and the signal on the signal line 56*b,* and conducts the device address to the registration table reading circuit 61 when there are signals on both signal lines.

The AND gate 90 receives the output of the AND gate 86 and the signal on the signal line 56*a,* and conducts the device address from the address register 53 to the registration table reading circuit 61 when there are signals on both signal lines. The registration table reading circuit 61 reads the registration table 100 for illegality preventive information corresponding to the device address when it receives the device address from the AND gate 87 (the case when illegality preventive information is set in the terminal unit), and outputs the information as output data A of this circuit. On the other hand, when it receives the device address from the AND gate 90 (the case when illegality preventive information of the terminal unit is deleted), it does not access the registration table 100, but generates zero codes with the same number of bits as in illegality preventive information and outputs the codes as output data A of this circuit. The output data A is transmitted over the telephone line as terminal registration data as shown in FIG. 5.

The flip-flop 60 in the registration flag register 59 can be reset through the signal line 95, which is supplied with a signal from a keyboard (not shown) provided in the central unit.

The registration table 100 is arranged to register specific information (illegality preventive information) corresponding to each device address, and it also functions as a buffer for storing preset illegality preventive information. The operation of the illegality preventive information registration process system has been described.

The operation of the transaction process will be described next.

The AND gate 80 opens when illegality preventive information is set to data received by the reception buffer 50 and there is a signal on the output signal line 51*a* of the process discrimination circuit 51, so that the illegality preventive information in the received data is transferred to the illegality preventive information register 55. The illegality preventive information register 55 holds illegality preventive information in received data coming through the AND gate 80.

The AND gate 83 receives the output of the address register 53 and a signal on the output signal line 51*a* from the process discrimination circuit 51, and opens when the device address is set into the address register 53 and a signal is sent out over the signal line 51*a,* so that the device address is transferred to the address decoder 58. The address decoder 58 is arranged identically to the above-mentioned address decoder 57, and it receives the device address and sends out the output signal corresponding to the device address over the signal lines 58*a*-58*h.* (Entry of device addresses "1", "2", . . . , "8" correspond to signal lines 58*a,* 58*b,* . . . , 58*h,* respectively.) If an illegal device address is entered (a device address other than 1-8 in this embodiment), an error output signal E1 is issued.

The AND gate 88 is provided corresponding to each output signal line of the address decoder 58, each receiving an output signal from the address decoder 58 and an output signal (S1-S8) of the registration flag register 59 provided for each device address, and it opens when there are signals on both inputs so as to conduct the signal. The OR gate 70 receives the output signals from the AND gates 88, and it opens when it receives any input signal so as to conduct the signal.

The AND gate 89 receives the output signal from the OR gate 70 and the output signal from the address register 53, and it opens when there are signals on both inputs so that the device address in the address register 53 is transferred to the registration table reading circuit 62.

The registration table reading circuit 62 receives the device address through the AND gate 89, and reads out information corresponding to the device address in the illegality preventive information registration table 100 and sends it to the comparator 63. The comparator 63 receives illegality preventive information from the registration reading circuit 62, and then reads out the contents of the illegality preventive information register 55. The comparator 63 compares data from the registration table reading circuit 62 with data from the illegality preventive information register 55, and produces an output signal B when both data coincide or issues an error output signal E1 when the data conflict.

The output signal B is used to initiate the transaction process. When this signal is issued, the transaction process is carried out for received data, and the result of processing is transmitted as transaction reply data to the terminal unit which has sent the transaction data. On the other hand, if the device address in transaction data is not correct or if the registration flag 59 for the terminal unit which has sent transaction data is invalidated, or if illegality preventive information in the transaction data does not coincide with illegality preventive information read out from the illegality preventive registration table 100, an error signal E1 is issued by the comparator 63. In this case, the transaction process is aborted and the error processing is carried out. Reply data is not transmitted to the terminal unit which has sent transaction data.

The operation of the central unit and the terminal unit has been described in detail. The central unit holds specific information (illegality preventive information) corresponding to each terminal unit, and registers it to the terminal unit. The terminal unit transmits the registered illegality preventive information together with transaction data to the central unit. Upon reception of the transaction data, the central unit can check the terminal unit which has sent the transaction data for whether the illegality preventive information is already registered and whether the received illegality preventive information coincides with illegality preventive information corresponding to that terminal unit stored in the illegality preventive information registration table, thereby providing the following advantages.

(1) Since only the terminal unit with the registration of the specific information is allowed to carry out the transaction process, an illegal transaction using ineligible devices (a unit under the maintenance activity, a unit owned by another company, but having the same capabilities as those of the eligible unit, etc.) can be prevented.

(2) If a terminal unit is stolen during transportation, the contents of the illegality preventive information registration table in the central unit corresponding to the stolen terminal unit can be rewritten so that the stolen unit is unusable for the transaction process, whereby illegal transaction using a stolen terminal unit can be prevented.

(3) The transaction guidance is registered together with illegality preventive information to the illegality preventive information registration table in the central unit, so that when illegality preventive information is registered to the terminal unit the transaction guidance is also registered, whereby the transaction range can be limited individually for each terminal unit. Consequently, in consideration of the visiting place, the visitor, the purpose and the like, only necessary guidance may be registered by an executive manager or the like before carrying the terminal device out of the office, whereby the range of illegal transaction can be minimized even if the carrying visitor is kidnapped during the business activity and forced to make an illegal transaction.

(4) The contents of the illegality preventive information registration table is altered daily and registration of illegality preventive information to the terminal unit is carried out by a specially appointed person. The registration operator is informed of part or all registered information by means of the telephone and the like, and the information is passed only to the operator who actually carries out the transaction operation. The operator who carries out the transaction operation using the terminal unit with illegality preventive information registered therein will enter the information passed by the registration operator at entry of transaction data so that it is transmitted to the central unit. The central unit does not carry out the transaction process if both of illegality preventive information sent automatically by the terminal unit and illegality preventive information entered by the operator do not coincide or do not have a certain correlation to part or all of information corresponding to that terminal unit stored in the illegality preventive information registration table in the central unit, thereby preventing illegal transaction by business related persons by illegal use of the terminal unit.

In the foregoing embodiment, magnetic card data is used when the terminal unit requests the central unit for registration. However, data entered through the keyboard or read on the disk storage may be used instead.

In the foregoing embodiment, magnetic card data, registration request data, registration completion data, transaction data, and transaction reply data in the forms shown in FIGS. 3, 4, 5, 6 and 7, respectively, have been described. However, the order of the fields in the data may be changed, some fields may be omitted, and other fields may be added.

In the foregoing embodiment, when the central unit transmits illegality preventive information to the terminal unit or when the terminal unit transmits illegality preventive information to the central unit, the whole illegality preventive information read out from the illegality preventive information table or the illegality preventive information buffer is transmitted. However, both units may be arranged to transmit part of illegality preventive information, or arrangement may be made such that one unit transmits part of the information while another unit transmits the whole information.

In the foregoing embodiment, the central unit carries out the transaction process when illegality preventive information sent from the terminal unit coincides with illegality preventive information read out from the illegality preventive information registration table. However, arrangement may be made such that both informations are operated on a certain computation or combination and the transaction process is carried out when the expected result is obtained.

In the foregoing embodiment, each block of the central unit is explained as an individual circuit. However, by use of a general purpose computer for the central unit, some individual circuits may be replaced. For example, the illegality preventive information registration table and the registration flag register can be realized within the main storage of the general purpose computer, and the registration code register, the address register, the illegality preventive information register, comparator, etc. can be realized by the arithmetic processing unit of the general purpose computer.

In the same way, the unit control circuit, the MSRW control circuit, the printer control circuit, the display control circuit, the keyboard control circuit, etc. can be realized using individual general purpose microprocessors.

In the foregoing embodiment, the terminal unit is provided with various input devices and output devices. However, these devices may be of different types, and some devices may be omitted or other devices may be added.

In the foregoing embodiment, the system including only the central unit 1 and the terminal unit 3 interconnected through the public communication line has been described. However, another unit may be placed between them. For example, a terminal control unit for controlling a plurality of terminal units may be provided, and the terminal control unit 1 is connected to the central unit through the leased line, while the terminal units 3 are connected to the terminal control unit through the public communication line.

As described above, the present invention effectively prevents the use of ineligible terminal unit for transaction.

We claim:

1. A transaction processing system comprising a central unit and at least one terminal unit connected to said central unit by a communication line, so that transaction data from said terminal unit may be transmitted together with the address of said terminal unit to said central unit so as to carry out data processing in said central unit in correspondence to said transaction data;

said terminal unit including first means for storing first specific information previously assigned to said terminal unit to authorize said terminal unit to use said central unit, and second means for transmitting to said communication line a transaction request message including said first specific information, said transaction data and said terminal unit address;

said central unit including third means for storing second modifiable specific information and registered in correspondence to each terminal unit which might be connected to said central unit, and fourth means connected to said communication line for conducting data processing to carry out a transaction corresponding to the transaction data included in a received transaction request message only when a predetermined relation is detected between said first specific information included in said received transaction request message and said second specific information read out of said third means on the basis of said terminal unit address included in said received transaction request message, wherein data processing of transaction data from a nonauthorized terminal unit is prevented.

2. A transaction processing system according to claim 1 wherein said central unit includes fifth means for transmitting said first specific information in a reply message from said central unit to said terminal unit in response to a registration request message from said terminal unit.

3. A transmission processing system according to claim 1 wherein said fourth means in said central unit includes means for storing flag information indicating a state of validity or invalidity for said first specific information and means for preventing said transaction from being carried out when said flag information indicates invalidity of said first specific information without regard to said predetermined relation between said first specific information and said second specific information.

4. A transaction processing system according to claim 1 wherein said terminal unit is portable and connectable through a telephone set with said central unit by said communication line.

5. A transaction processing system according to claim 2 wherein said fourth means in said central unit includes means for storing flag information indicating a state of validity or invalidity for said first specific information and means for preventing said transaction from being carried out when said flag information indicates invalidity of said first specific information without regard to said predetermined relation between said first specific information and said second specific information.

6. A transaction processing system according to claim 5 wherein said terminal unit is portable and connectable through a telephone set with said central unit by said communication line.

7. A transaction processing system according to claim 3 wherein said central unit includes fifth means for transmitting said first specific information in a reply message from said central unit to said terminal unit in response to a registration request message from said terminal unit.

8. A transaction processing system according to claim 7 wherein said central unit includes means for updating said flag information stored in said flag information storing means to indicate validity only for a terminal unit which has originated said registration request message for said first specific information.

9. A transaction processing system according to claim 8 wherein said terminal unit is portable and connectable through a telephone set with said central unit by said communication line.

* * * * *